United States Patent
Zhou

(10) Patent No.: US 11,218,780 B2
(45) Date of Patent: Jan. 4, 2022

(54) DATA PROCESSING METHOD AND DEVICE

(71) Applicant: BEIJING DAJIA INTERNET INFORMATION TECHNOLOGY CO., LTD., Beijing (CN)

(72) Inventor: Chao Zhou, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/764,823

(22) PCT Filed: Nov. 13, 2018

(86) PCT No.: PCT/CN2018/115216
§ 371 (c)(1),
(2) Date: May 15, 2020

(87) PCT Pub. No.: WO2019/096122
PCT Pub. Date: May 23, 2019

(65) Prior Publication Data
US 2020/0382846 A1      Dec. 3, 2020

(30) Foreign Application Priority Data

Nov. 16, 2017   (CN) .......................... 201711137772.X

(51) Int. Cl.
H04N 21/647    (2011.01)
H04N 21/231    (2011.01)
H04N 21/262    (2011.01)

(52) U.S. Cl.
CPC . *H04N 21/64792* (2013.01); *H04N 21/23106* (2013.01); *H04N 21/26208* (2013.01)

(58) Field of Classification Search
CPC ....... H04N 21/64792; H04N 21/23106; H04N 21/26208
See application file for complete search history.

(56) References Cited

U.S. PATENT DOCUMENTS 7,688,324 B1    3/2010  Auld et al.
2014/0082289 A1    3/2014  Blake et al.

FOREIGN PATENT DOCUMENTS

CN    101753440 A    6/2010
CN    101800699 A    8/2010
(Continued)

OTHER PUBLICATIONS

International Search Report and Written Opinion issued by the International Searching Authority (ISA/CN in PCT Application No. PCT/CN2018/115216 dated Jan. 30, 2019. 9 pages, including English translation of International Search Report.

*Primary Examiner* — Joshua D Taylor
(74) *Attorney, Agent, or Firm* — Meunier Carlin & Curfman LLC

(57) ABSTRACT

Embodiments of the present application provide a data processing method and device. The method comprises: determining if a data packet satisfies a receipt condition based on a cache occupancy amount and a preset cache occupancy threshold, wherein the cache occupancy threshold is determined based on the priority level of a given data packet; and storing the data packet in the cache when the data packet satisfies the receipt condition. Embodiments of the present application ensure normal transmission of high priority data packets, thereby improving the transmission quality of streaming media data, and achieving an improvement in the broadcast quality of streaming media.

11 Claims, 1 Drawing Sheet

---

Determining whether a current data packet satisfies a receipt condition according to a cache occupation amount and a preset cache occupation threshold — 101

Storing the current data packet into a cache when the current data packet satisfies the receipt condition — 102

(56) References Cited

FOREIGN PATENT DOCUMENTS

| CN | 102025638 | A | * | 4/2011 |
| CN | 102025638 | A |   | 4/2011 |
| CN | 102404206 | A |   | 4/2012 |
| CN | 102480419 | A |   | 5/2012 |
| CN | 102629910 |   |   | 8/2012 |
| CN | 102629910 | A | * | 8/2012 |
| CN | 102629910 | A |   | 8/2012 |
| CN | 104378308 | A |   | 2/2015 |
| CN | 106789722 | A |   | 5/2017 |
| CN | 108055556 | A |   | 5/2018 |

* cited by examiner

DATA PROCESSING METHOD AND DEVICE

CROSS REFERENCE TO RELATED APPLICATIONS

The present application is a National Stage of International Application No. PCT/CN2018/115216, filed on Nov. 13, 2018, which claims priority to Chinese Patent Application No. 201711137772.X, filed with the Chinese Patent Office on Nov. 16, 2017 and entitled "DATA PROCESSING METHOD AND DEVICE", the entire contents of which are incorporated herein by reference.

FIELD

The present application relates to the technical field of communication, and in particular to a data processing method and device.

BACKGROUND

The streaming media refers to a media format played on the Internet in a streaming transmission mode, and audios, videos or multimedia files can be transmitted through the streaming media. Without the necessity to download an entire file before play, the streaming media merely requires to store a beginning part of the content into a cache, and the rest part of the file would continue to be downloaded in background from a server during the play.

SUMMARY

On a first aspect, the embodiment of the present application provides a data processing method, including:
  determining whether a data packet satisfies a receipt condition based on a cache occupancy amount and a preset cache occupancy threshold, wherein the cache occupancy threshold is determined based on a priority of the data packet; and
  storing the data packet into a cache in response to that the data packet satisfies the receipt condition.
In some embodiments, the determining whether the data packet satisfies the receipt condition based on the cache occupancy amount and the preset cache occupancy threshold includes:
  determining that the data packet satisfies the receipt condition in response to that the cache occupancy amount is less than a cache occupancy threshold corresponding to a first priority.
In some embodiments, the method further includes:
  determining whether a priority of the data packet is higher than a second priority in response to that the cache occupancy amount is greater than a cache occupancy threshold corresponding to the second priority and less than a cache occupancy threshold corresponding to a third priority, wherein the second priority is higher than or equal to the first priority; and
  determining that the data packet satisfies the receipt condition in response to that a priority of the data packet is higher than the second priority.
In some embodiments, the method further includes:
  determining that the data packet fails to satisfy the receipt condition in response to that a priority of the data packet is lower than the second priority.
In some embodiments, the method further includes:
  determining a discarding probability of the data packet based on the cache occupancy amount and a size of the data packet in response to that a priority of the data packet is equal to the second priority; and
  determining that the data packet satisfies the receipt condition in response to that the discarding probability of the data packet is less than a preset probability threshold; otherwise, determining that the data packet fails to satisfy the receipt condition.
In some embodiments, the method further includes:
  discarding the data packet in response to that the data packet fails to satisfy the receipt condition.
On a second aspect, the embodiment of the present application provides a data processing device, including:
  a first judging module configured to determine whether a data packet satisfies a receipt condition based on a cache occupancy amount and a preset cache occupancy threshold, wherein the cache occupancy threshold is determined based on a priority of the data packet; and
  a first processing module configured to store the data packet into a cache in response to that the data packet satisfies the receipt condition.
In some embodiments, the judging module includes:
  a first judging sub-module configured to determine that the data packet satisfies the receipt condition in response to that the cache occupancy amount is less than a cache occupancy threshold corresponding to a first priority.
In some embodiments, the device further includes:
  a priority judging module configured to determine whether a priority of the data packet is higher than a second priority in response to that the cache occupancy amount is greater than a cache occupancy threshold corresponding to the second priority and less than a cache occupancy threshold corresponding to a third priority, wherein the second priority is higher than or equal to the first priority, and the third priority is higher than the second priority; and
  a second judging module configured to determine that the data packet satisfies the receipt condition in response to that a priority of the data packet is higher than the second priority.
In some embodiments, the device further includes:
  a third judging module configured to determine that the data packet fails to satisfy the receipt condition in response to that a priority of the data packet is lower than the second priority.
In some embodiments, the device further includes:
  a probability calculating module configured to determine a discarding probability of the data packet based on the cache occupancy amount and a size of the data packet in response to that a priority of the data packet is equal to the second priority; and
  a fourth judging module configured to determine that the data packet satisfies the receipt condition in response to that the discarding probability of the data packet is less than a preset probability threshold, otherwise, determine that the data packet fails to satisfy the receipt condition.
In some embodiments, the device further includes:
  a second processing module configured to discard the data packet in response to that the data packet fails to satisfy the receipt condition.
On a third aspect, the embodiment of the present application provides a computing device, including: a memory, a processor, and a computer program stored on the memory and executable on the processor, wherein when the computer program is executed by a processor, following steps are realized:

determining whether a data packet satisfies a receipt condition based on a cache occupancy amount and a preset cache occupancy threshold, wherein the cache occupancy threshold is determined based on a priority of the data packet; and storing the data packet into a cache in response to that the data packet satisfies the receipt condition.

On a fourth aspect, the embodiment of the present application provides a non-transitory computer readable storage medium, wherein when a processor of a computing device in the storage medium performs execution, the computing device is enabled to execute a data processing method, and the method includes:

determining whether a data packet satisfies a receipt condition based on a cache occupancy amount and a preset cache occupancy threshold, wherein the cache occupancy threshold is determined based on a priority of the data packet; and storing the data packet into a cache in response to that the data packet satisfies the receipt condition.

On a fifth aspect, the embodiment of the present application provides a computer program product including instructions which, when run on a computer, causes the computer to implement the steps of the method based on the first aspect.

BRIEF DESCRIPTION OF THE DRAWINGS

The drawings herein are incorporated in and constitute a part of the specification. They show the embodiments consistent with the present disclosure and are used in conjunction with the specification to explain the principles of the present application.

DETAILED DESCRIPTION OF THE EMBODIMENTS

Exemplary embodiments of the present disclosure will be described below in more detail with reference to the accompanying drawings. Although the accompanying drawings illustrate the exemplary embodiments of the present disclosure, it should be understood that the present disclosure can be realized in various forms and should not be construed as limited to the embodiments described herein. Rather, these embodiments are provided so that the present disclosure will be understood more thoroughly, and will fully convey the scope of the present disclosure to those skilled in the art.

Figure 1:
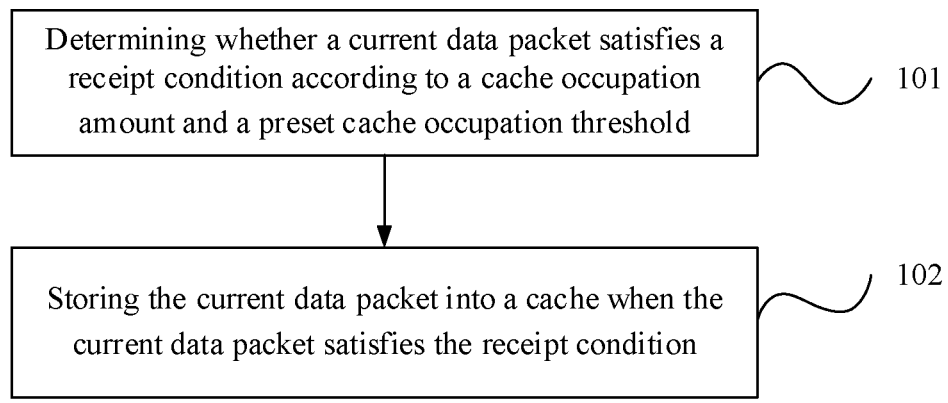
FIG. 1 is a flowchart of steps of a data processing method in some embodiments.

Referring to FIG. 1 that is a flowchart of steps of a data processing method in some embodiments, the method may include the following steps:

Step 101, determining whether a current data packet satisfies a receipt condition based on a cache occupancy amount and a preset cache occupancy threshold, wherein the cache occupancy threshold is determined based on a priority of the data packet.

Step 102, storing the current data packet into a cache when the current data packet satisfies the receipt condition.

In some embodiments, whether the current data packet satisfies the receipt condition can be determined based on the cache occupancy amount and the preset cache occupancy threshold during a streaming media data transmitting process, and if satisfying the receipt condition, the current data packet can be stored in the cache and thereby transmitted normally. Since the cache occupancy threshold is determined based on the priority of the data packet, the data packet that satisfies the receipt condition may have a higher priority in some embodiments, so that normal transmission of the data packet having the higher priority can be ensured even if the cache occupancy amount is rather high, which may improve transmission quality of the streaming media data, and thereby improves broadcast quality of streaming media. In some embodiments, when the current data packet fails to satisfy the receipt condition, the current data packet may be discarded directly to prevent the occurrence of cache overflow.

In some embodiments, the cache occupancy threshold is positively related to the priority of the data packet. That is, the higher the priority of the data packet, the larger the corresponding cache occupancy threshold. So the cache occupancy threshold can be used to filter data packets having a low priority. As the occupancy rate of the cache gradually increases, it can ensure that data packets having a higher priority enter the cache, and the data packets having the lower priority are discarded.

In some embodiments, the cache size may be divided based on the level and number of priorities to obtain the cache occupancy threshold corresponding to the priority of the data packet. For example, assuming the number of priorities corresponding to streaming media data packets to be transmitted is PN, the $i^{th}$ priority is denoted as $PRI_i$, where $1 \leq i \leq PN$, and $PRI_1 < PRI_2 < \ldots < PRI_{PN}$. Assuming the cache size is S, PN cache occupancy thresholds can be divided based on the cache size S, which respectively corresponds to the priorities $PRI_1, PRI_2, \ldots$ and $PRI_{PN}$. In particular, the cache occupancy threshold corresponding to the $i^{th}$ priority can be calculated by the following formula:

$$th_1 = \frac{S}{2} \qquad (1)$$

$$th_i = th_1 + \frac{i-1}{PN} \times \frac{S}{2}$$

In some embodiments, $2 \leq i \leq PN+1$, and $th_1 < th_2 < \ldots < th_{PN} < th_{PN+1}$. That is, PN+1 cache occupancy thresholds are divided based on the cache size S, where the former PN cache occupancy thresholds correspond to the priorities $PRI_1, PRI_2, \ldots$ and $PRI_{PN}$ respectively, and a value of the $(PN+1)^{th}$ cache occupancy threshold $th_{N+1}$ is the cache size S, so as to prevent the occurrence of cache overflow as caused by still receiving the data packet even if the cache is full.

In some embodiments, assuming transmitted steaming media data includes video data and audio data, a priority of the audio data is set to be higher than that of the video data that include an I-frame, a P-frame, a B-frame, and a BREF-frame. Based on the importance in the video data, the priority can be set as follows: B-frame<BREF-frame<P-frame<I-frame<audio data.

Assuming the cache size is S, a cache occupancy threshold corresponding to a B-frame data packet can be calculated based on the above formula (1) as $$\frac{S}{2},$$

and a cache occupancy threshold corresponding to a BREF-frame data packet is $$\frac{S}{2} + \frac{1}{5} \times \frac{S}{2} = \frac{3S}{5}.$$

Similarly, a cache occupancy threshold corresponding to a P-frame data packet can be calculated as $$\frac{7S}{10};$$

a cache occupancy threshold corresponding to an I-frame data packet can be calculated as $$\frac{4S}{5};$$

and a cache occupancy threshold corresponding to an audio data packet can be calculated as $$\frac{9S}{10}.$$

It can be seen that the $th_i$ is evenly distributed in the last $$\frac{S}{2}$$

area of the cache. Thus, in some embodiments, when the cache occupancy amount exceeds half of the cache size, it can be dynamically determined whether to discard the data packet based on priorities of the data packet and the cache occupancy amount, which ensures that the discarding probability of the data packets having the low priorities is greater than that of the data packets having the high priorities. Thus, under the condition of avoiding the cache overflow, the normal transmission of the data packets having the high priorities can be ensured to a greatest extent, which thereby improves broadcast quality of the streaming media data.

It should be understood that the method for setting the cache occupancy threshold based on the priority of the data packet is only an application example of the present application. In practical applications, the embodiment of the present application does not limit a specific manner for setting the cache occupancy threshold.

In some embodiments, determining whether a current data packet satisfies a receipt condition based on a cache occupancy amount and a preset cache occupancy threshold may include the following steps:
determining that the current data packet satisfies the receipt condition if the cache occupancy amount is less than a cache occupancy threshold corresponding to a first priority.

The first priority may be the lowest priority. For example, the first priority may be the priority of the B-frame data packet in the aforesaid example. If the cache occupancy amount is less than the cache occupancy threshold corresponding to the first priority, it indicates that the cache currently has a large free space and can receive data packets of any size and priority. Thus, it can be determined that the current data packet satisfies the receipt condition.

In a possible implementation, the aforesaid cache occupancy amount may be the current occupancy amount of the device cache. In another possible implementation, the aforesaid cache occupancy amount may be the estimated occupancy amount after the cache stores the current data packet. In some embodiments, as to the $n^{th}$ data packet, the occupancy amount $\eta$ can be calculated based on the following formula:

$$\eta = S_{cur} + B_n \quad (2)$$

where $S_{cur}$ denotes the current occupancy of the cache, and $B_n$ denotes the size of the $n^{th}$ data packet. $\eta$ denotes the occupancy amount after the $n^{th}$ data packet is stored into the cache. Thus, if the cache occupancy amount $\eta$ is less than the cache occupancy threshold corresponding to the first priority, such as less than $$\frac{S}{2},$$

it indicates that the cache occupancy amount is still less than half of the cache size even if the $n^{th}$ data packet is stored in the cache. That is, the cache still has a rather large free space. Thus, it can be determined that the $n^{th}$ data packet satisfies the receipt condition, and thereby is stored into the cache.

It should be understood that taking the lowest priority as the first priority is merely an application example of the present application. In practical applications, the embodiment of the present application does not limit the specific level of the first priority. For example, the first priority may be a priority having one level higher than the lowest priority, such as, the priority of the BREF-frame data packet or the like.

In some embodiments, if the $n^{th}$ data packet is stored in the cache, the cache occupancy amount $\eta$ exceeds the cache size S, which indicates that the cache may overflow. At this point, it can be determined that the $n^{th}$ data packet fails to satisfy the receipt condition, and is directly discarded to avoid the occurrence of cache overflow.

In some embodiments, determining whether a current data packet satisfies a receipt condition based on a cache occupancy amount and a preset cache occupancy threshold may further include the following steps:
determining whether a priority of the current data packet is higher than a second priority if the cache occupancy amount is greater than a cache occupancy threshold corresponding to the second priority and less than a cache occupancy threshold corresponding to a third priority, wherein the second priority is higher than or equal to the first priority; and
determining that the current data packet satisfies the receipt condition if the priority of the current data packet is higher than the second priority.

In practical applications, if the $n^{th}$ data packet is stored in the cache, and the cache occupancy amount $\eta$ is greater than the cache occupancy threshold corresponding to the second priority, it indicates that the cache size is high, and the priority of the data packet shall be judged, and the data packet having the low priority shall be actively discarded. The second priority may be higher than or equal to the first priority.

If it is determined that the cache occupancy amount is greater than the cache occupancy threshold corresponding to the second priority and less than the cache occupancy threshold corresponding to the third priority, it indicates that the cache still has some free space for storing the data packet having the high priority even if the cache occupancy amount is rather high. For example, the data packet having a priority higher than the second priority can be stored, but the data packet having a priority lower than the second priority is discarded. Thus, if the priority of the current data packet is higher than the second priority, it is determined that the current data packet satisfies the receipt condition and can be stored in the cache. If the priority of the current data packet is lower than the second priority, it is determined that the current data packet fails to satisfy the receipt condition.

It should be understood that the specific levels of the first, second and third priorities are not limited in some embodiments. The second priority may be higher than or equal to the first priority, and the third priority may be higher than the second priority.

In some embodiments, if the priority of the current data packet is equal to the second priority, it may be either deemed that the current data packet satisfies the receipt condition, or that the current data packet fails to satisfy the receipt condition. It should be understood that, in practical applications, when the priority of the current data packet is equal to the second priority, the embodiment of the present application does not limit a specific manner for determining whether the current data packet satisfies the receipt condition.

In some embodiments, when a priority of a current data packet is equal to a second priority, some embodiments may determine whether the current data packet satisfies a receipt condition based on a discarding probability of the current data packet. In some embodiments, determining whether the current data packet satisfies the receipt condition based on a cache occupancy amount and a preset cache occupancy threshold may further include the following steps:

determining the discarding probability of the current data packet based on the cache occupancy amount and a size of the current data packet if the priority of the current data packet is equal to the second priority; and determining that the current data packet satisfies the receipt condition if the discarding probability of the current data packet is less than a preset probability threshold; otherwise, determining that the current data packet fails to satisfy the receipt condition.

In some embodiments, the discarding probability $P_n$ of the $n^{th}$ data packet can be calculated by the following formula:

$$P_n = \frac{S_{cur} + B_n - th_x}{th_{x+1} - th_x} \quad (3)$$

where, $S_{cur}$ denotes the current occupancy amount of the cache; $B_n$ denotes the size of the $n^{th}$ data packet; $th_x$ denotes the cache occupancy threshold corresponding to the second priority; and $th_{x-1}$ denotes a cache occupancy threshold corresponding to a third priority. It should be noted that the embodiment of the present application does not limit a specific value of the preset probability threshold. For example, the preset probability threshold may be set as 0.7. Regarding the $n^{th}$ data packet, if the cache occupancy amount is greater than the cache occupancy threshold corresponding to the second priority and less than the cache occupancy threshold corresponding to the third priority, and if the priority of the $n^{th}$ data packet is equal to the second priority, the discarding probability $P_n$ of the $n^{th}$ data packet can be calculated based on the above formula (3). Assuming the $P_n$ as calculated is 0.3, which is less than the preset probability threshold 0.7, it may be determined that the $n^{th}$ data packet satisfies the receipt condition.

In some embodiments, when the cache still has some free space even if the cache occupancy amount is large, that is, when the cache occupancy amount is greater than the cache occupancy threshold corresponding to the second priority and less than the cache occupancy threshold corresponding to the third priority, the current data packet having a priority higher than the second priority can be received, and the current data packet having a priority less than the second priority would be discarded. In addition, based on the discarding probability of the current data packet, it can be determined whether to receive or discard the data packet having a priority equal to the second priority. By respectively judging whether the current data packet satisfies the receipt condition under three conditions that the priority is greater than, less than and equal to the second priority, the data packet can be transmitted steadily step by step based on the priority.

It should be noted that whether the current data packet satisfies the receipt condition can be determined in some embodiments based on the cache occupancy amount and the preset cache occupancy threshold. In actual applications, the cache occupancy rate may be adopted in some embodiments to replace the cache occupancy amount for determining whether the current data packet satisfies the receipt condition or not. In some embodiments, the cache occupancy rate $r$ may be calculated by the following formula:

$$r = \frac{S_{cur} + B_n}{S} \quad (4)$$

where, $S_{cur}$ denotes the current occupancy of the cache; $B_n$ denotes the size of the $n^{th}$ data packet; and S denotes the cache size. After replacing the cache occupancy amount with the cache occupancy rate, the cache occupancy rate $r$ is compared with the ratio of the cache occupancy threshold to the cache size during the process of determining whether the current packet satisfies the receipt condition. For example, by comparing $r$ with $$\frac{th_1}{S},$$

it may be determined that the current data packet satisfies the receipt condition if $r$ is less than $$\frac{th_1}{S},$$

wherein $th_1$ is a cache occupancy threshold corresponding to a first priority. The specific judging process is similar to the process based on the cache occupancy amount, and will not be described herein again.

In summary, in some embodiments, whether the current data packet satisfies the receipt condition may be determined based on the cache occupancy amount and the preset cache occupancy threshold during the streaming media data transmission process, and if satisfying the receipt condition, the current packet data can be stored in the cache and thereby transmitted normally. Since the cache occupancy threshold is determined based on the priority of the data packet, the data packet that satisfies the receipt condition may have a higher priority. Through the embodiment of the present application, the normal transmission of the data packet having the high priority can be ensured even if the cache occupancy amount is rather high, which may improve transmission quality of the streaming media data, and thereby improves broadcast quality of the streaming media.

Figure 2:
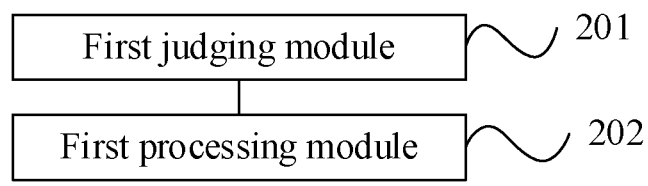
FIG. 2 is a block diagram of a structure of a data processing device in some embodiments.

Referring to FIG. 2 that is a block diagram of a structure of a data processing device in some embodiments. The device may include the following modules:

- a first judging module 201, configured to determine whether a current data packet satisfies a receipt condition based on a cache occupancy amount and a preset cache occupancy threshold, wherein the cache occupancy threshold is determined based on a priority of the data packet; and
- a first processing module 202, configured to store the current data packet into a cache when the current data packet satisfies the receipt condition.

In some embodiments, the first judging module 201 may include:

- a first judging sub-module, configured to determine that the current data packet satisfies the receipt condition if the cache occupancy amount is less than a cache occupancy threshold corresponding to a first priority.

In some embodiments, the device further includes:

- a priority judging module, configured to judge whether a priority of the current data packet is higher than a second priority if the cache occupancy amount is greater than a cache occupancy threshold corresponding to the second priority and less than a cache occupancy threshold corresponding to a third priority, wherein the second priority is higher than or equal to the first priority, and the third priority is higher than the second priority; and
- a second judging module, configured to determine that the current data packet satisfies the receipt condition if the priority of the current data packet is higher than the second priority.

In some embodiments, the device further includes:

- a third judging module, configured to determine that the current data packet fails to satisfy the receipt condition if the priority of the current data packet is lower than the second priority.

In some embodiments, the device further includes:

- a probability calculating module, configured to determine a discarding probability of the current data packet based on the cache occupancy amount and a size of the current data packet if the priority of the current data packet is equal to the second priority; and
- a fourth judging module, configured to determine that the current data packet satisfies the receipt condition if the discarding probability of the current data packet is less than a preset probability threshold, otherwise, determine that the current data packet fails to satisfy the receipt condition.

In some embodiments, the device further includes:

- a second processing module, configured to discard the current data packet when the current data packet fails to satisfy the receipt condition.

In some embodiments, whether the current data packet satisfies the receipt condition can be determined based on the cache occupancy amount and the preset cache occupancy threshold during a streaming media data transmitting process, and if satisfying the receipt condition, the current packet data can be stored in the cache and thereby transmitted normally. Since the cache occupancy threshold is determined based on the priority of the data packet, the data packet that satisfies the receipt conditions may have a higher priority. Through the embodiment of the present application, the normal transmission of the data packet having the high priority can be ensured even if the cache occupancy amount is rather high, which may improve transmission quality of the streaming media data, and thereby improves broadcast quality of the streaming media.

Figure 3:
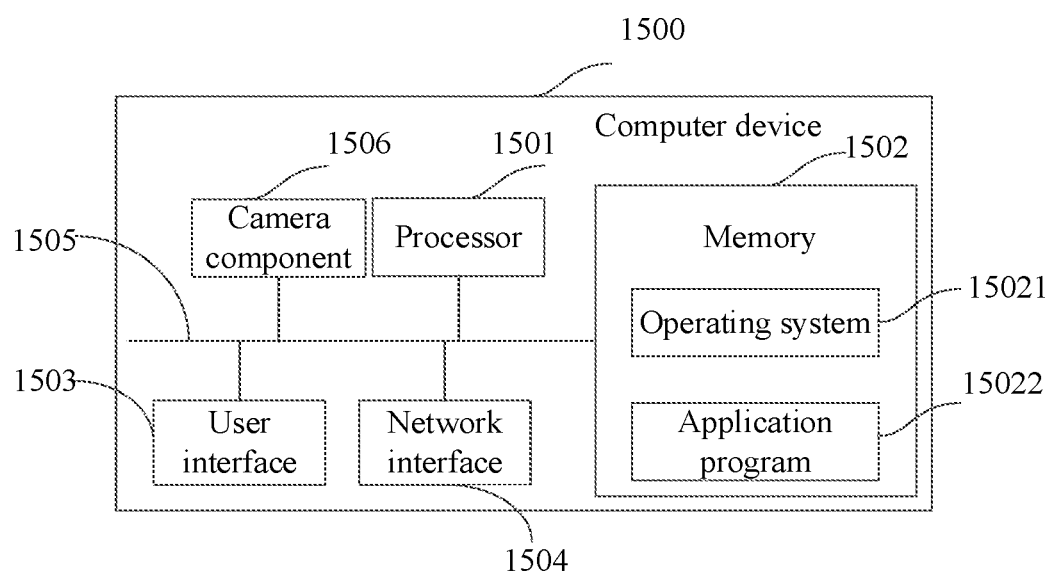
FIG. 3 is a schematic diagram of a structure of a computing device in some embodiments.

Referring to FIG. 3 that is a schematic diagram of a structure of a computing device 150 in some embodiments, which may include at least one processor 1501, a memory 1502, at least one network interface 1504, and a user interface 1503. The respective components in the computing device 1500 are coupled together by a bus system 1505. It should be understood that the bus system 1505 is configured to implement connection and communication between these components. Except a data bus, the bus system 1505 further includes a power bus, a control bus, and a status signal bus. However, for the sake of clarity, the respective buses are marked as bus system 1505 in FIG. 3. The computing device 1500 further includes a camera component 1506, and the camera component 1506 includes a camera.

The user interface 1503 may include a display, a keyboard, a pointing device (for example, a mouse and a trackball), a touch pad, or a touch screen, etc.

It should be understood that the memory 1502 in some embodiments may be a volatile memory or a non-volatile memory, or may include both of the volatile and non-volatile memories. The non-volatile memory may be a read-only memory (ROM), a programmable ROM (PROM), an erasable PROM (EPROM), an electrically EPROM (EEPROM) or a flash memory. The volatile memory may be a random access memory (RAM) serving as an external high-speed cache. By way of example and not limitation, many forms of RAM are available, such as a static RAM (SRAM), a dynamic RAM (DRAM), a synchronous DRAM (SDRAM), a double data rate SDRAM (DDRSDRAM), an enhanced SDRAM (ESDRAM), a SynchlinkDRAM (SLDRAM), and a DirectRambusRAM (DRRAM). The memory 1502 of the system and method described in some embodiments of the present application is intended to include, but is not limited to, these and any other suitable types of memories.

In some implementations, the memory 1502 stores elements as follows: executable modules or data structures, or a subsets or expanded sets thereof, such as, an operating system 15021 and an application program 15022.

The operating system 15021 includes various system programs, such as a framework layer, a core library layer, and a driver layer, for implementing various basic services and processing hardware-based tasks. The application program 15022 includes various application programs, such as a media player, and a browser, for implementing various application services. The program for implementing the method in some embodiments may be included in the application program 15022.

In some embodiments, by calling the program or instruction stored in the memory 1502, the program or instruction stored in the application program 15022, the processor 1501 may be configured to: determine whether a current data packet satisfies a receipt condition based on a cache occupancy amount and a preset cache occupancy threshold, and store the current data packet into a cache when the current data packet satisfies the receipt condition, wherein the cache occupancy threshold is determined based on a priority of the data packet.

The method disclosed in the aforesaid embodiment of the present application may be applied to the processor 1501, or implemented by the processor 1501. The processor 1501 may be an integrated circuit chip and has a signal processing capability. During an implementation process, each step of the aforesaid method may be completed by an integrated logic circuit of hardware in the processor 1501 or an instruction in a software form. The aforesaid processor 1501 may be a general purpose processor, a digital signal processor (DSP), an application specific integrated circuit (ASIC), a field programmable gate array (FPGA) or other programmable logic device, a discrete gate or transistor logic device, or a discrete hardware component. Various methods, steps, and logical block diagrams disclosed in some embodiments of the present application can be implemented or executed. The general purpose processor may be a microprocessor or any conventional processor and the like. The steps of the method disclosed in combination with the embodiments of the present application may be directly implemented by a hardware decoding processor, or implemented by a combination of hardware and software modules in the decoding processor. The software module may be located in a storage medium mature in the art, such as a random access memory, a flash memory, a read-only memory, a programmable read-only memory, an electrically erasable programmable memory, a register, and the like. The storage medium is located in the memory 1502, and the processor 1501 reads information in the memory 1502 and completes steps of the aforesaid method in combination with the hardware.

It should be understood that examples described in some embodiments of the present application may be implemented by hardware, software, firmware, middleware, microcode, or a combination thereof. If they are implemented by hardware, processing units may be implemented within one or more application specific integrated circuits (ASICs), digital signal processors (DSPs), DSP devices (DSPDs), programmable logic devices (PLDs), field-programmable gate arrays (FPGAs), general purpose processors, controllers, micro-controllers, microprocessors, other electronic units configured to perform functions of the present application, or a combination thereof.

If they are implemented by software, the technology according to the embodiments of the present application may be implemented by modules (such as procedures, and functions) that perform functions described in some embodiments of the present application. Software codes may be stored in the memory and executed by the processor. The memory may be implemented in or outside the processor.

In some embodiments, the processor 1501 is further configured to determine that the current data packet satisfies the receipt condition if the cache occupancy amount is less than a cache occupancy threshold corresponding to a first priority.

In some embodiments, the processor 1501 is further configured to: judge whether a priority of the current data packet is higher than a second priority if the cache occupancy amount is greater than a cache occupancy threshold corresponding to the second priority and less than a cache occupancy threshold corresponding to a third priority, wherein the second priority is higher than or equal to the first priority, and the third priority is higher than the second priority; and determine that the current data packet satisfies the receipt condition if the priority of the current data packet is higher than the second priority.

In some embodiments, the processor 1501 is further configured to determine that the current data packet fails to satisfy the receipt condition if the priority of the current data packet is lower than the second priority.

In some embodiments, the processor 1501 is further configured to: determine a discarding probability of the current data packet based on the cache occupancy amount and a size of the current data packet if the priority of the current data packet is equal to the second priority; and determine that the current data packet satisfies the receipt condition if the discarding probability of the current data packet is less than a preset probability threshold; otherwise, determine that the current data packet fails to satisfy the receipt condition.

In some embodiments, the processor 1501 is further configured to discard the current data packet when the current data packet fails to satisfy the receipt condition.

Since the device embodiments are substantially similar to the method embodiments, they are described in a simple way, and similar parts of the method embodiments may be referred to for the device embodiments.

The algorithms and displays provided herein are not inherently related to any particular computer, virtual system, or other device. Various general purpose systems may also be used with the teaching based on this. According to the aforesaid description, the structure required to construct such a system is obvious. In addition, the present application is not directed to any particular programming language. It should be understood that various programming languages may be used to implement the content of the present application described herein, and the aforesaid description regarding the specific language is to disclose the best implementation of the present application.

The embodiment of the present application further provides a non-transitory computer readable storage medium, wherein when a processor of a computing device in the storage medium performs execution, the computing device is enabled to execute a data processing method, and the method includes:

it is determined that whether a current data packet satisfies a receipt condition based on a cache occupancy amount and a preset cache occupancy threshold, wherein the cache occupancy threshold is determined based on a priority of the data packet; and the current data packet is stored into a cache when the current data packet satisfies the receipt condition.

The embodiment of the present application further provides a computer program product including instructions which, when run on a computer, cause the computer to implement the steps of the data processing method.

The present specification provided herein gives numerous specific details. However, it should be understood that the embodiments of the present application can also be practiced without the specific details. In some examples, well-known methods, structures, and techniques have not been illustrated in detail so as not to obscure the understanding of the present specification.

Similarly, it should be understood that in the description of exemplary embodiments of the present application, various features of the present application are sometimes grouped together in a single embodiment, figure, or description thereof for the purpose of streamlining the disclosure and helping to understand one or more aspects of the present application. However, the method as disclosed should not be explained to reflect the intent that the present application claimed may claim more features than those explicitly recited in each claim. Rather, as reflected by the following claims, the aspect of the present application may be less than all of the features in a single embodiment disclosed above. Thus, claims following the specific implementation are hereby expressly incorporated into the specific implementation, with each claim standing on its own as a separate embodiment of the present application.

Those skilled in the art may understand that the modules in the device in an embodiment may be adaptively changed and provided in one or more devices different from the embodiment. The modules or units or components in some embodiments may be combined into one module or unit or component, and may be furthermore divided into a plurality of sub-modules or sub-units or sub-components. Except combinations where at least some of such features and/or processes or elements are mutually exclusive, all of the features and all of the processes or elements of any method or device disclosed in the present specification (including any accompanying claims, abstract and drawings) may be combined in any combination. Each feature disclosed in the present specification (including any accompanying claims, abstract and drawings) may be replaced by alternative features serving the same, equivalent or similar purpose, unless expressly stated otherwise.

Moreover, those skilled in the art may understand that although some embodiments described herein include some but not other features included in other embodiments, combinations of features of different embodiments are meant to be within the scope of the present application and form different embodiments. For example, in the following claims, any of the claimed embodiments may be used in any combination.

Respective component embodiments of the present application may be implemented in hardware, or in software modules running on one or more processors, or in a combination thereof. Those skilled in the art may understand that a microprocessor or a digital signal processor (DSP) may be adopted in practice to implement some or all functions of some or all components of the data processing method and device according to the embodiments of the present application. The present application may also be embodied as apparatus or device programs (e.g., computer programs and computer program products) for performing some or all of the method described herein. Such programs implementing the present application may be stored on a computer readable medium or may have a form of one or more signals. Such a signal may be downloaded from an Internet platform or provided on a carrier signal, or in any other form.

It should be noted that the aforesaid embodiments illustrate rather than limit the application, and those skilled in the art may design alternative embodiments without departing from the scope of the appended claims. In the claims, any reference signs placed between parentheses shall not be construed as limiting the claims. The word "comprising" does not exclude the presence of elements or steps not listed in a claim. The word "a" or "an" preceding an element does not exclude the presence of a plurality of such elements. The present application may be implemented by means of hardware comprising several distinct elements, and by means of a suitably programmed computer. In the unit claims listing several devices, several of these devices can be embodied by the same item of the hardware. The usage of the words first, second, and third or the like do not indicate any sequence, and these words may be interpreted as names.

The invention claimed is:

1. A data processing method, comprising:
    determining whether a cache occupancy amount corresponding to a data packet is greater than a second cache occupancy threshold and less than a third cache occupancy threshold;
    determining a priority of the data packet based on a cache occupancy amount being greater than a second cache occupancy threshold and less than a third cache occupancy threshold, wherein the priority comprises a first priority, a second priority and a third priority, the third priority is higher than the second priority, and the second priority is higher than the first priority;
    discarding the data packet in response to a determination that the priority of the data packet is the first priority;
    storing the data packet in response to a determination that the priority of the data packet is the third priority;
    calculating a discarding probability of the data packet based on a current occupancy amount of the cache, a size of the data packet, the second cache occupancy threshold, and the third cache occupancy threshold, in response to a determination that the priority of the data packet is the second priority, wherein the second cache occupancy threshold and the third cache occupancy threshold correspond to the second priority and the third priority respectively; and
    storing the data packet with the second priority into the cache in response to that the discarding probability is less than a preset cache occupancy threshold.

2. The method according to claim 1, further comprising:
    determining whether the cache occupancy amount is less than a first cache occupancy threshold; and
    storing the data packet into the cache in response to that the cache occupancy amount is less than a first cache occupancy threshold, wherein the first cache occupancy threshold corresponds to a first priority.

3. The method according to claim 1, wherein the first cache occupancy threshold is equal to a half of a size of the cache and occupies a first half of the cache size, and the second cache occupancy threshold and the third cache occupancy threshold distribute in a second half of the size of the cache.

4. The method according to claim 1, further comprising:
    discarding the data packet in response to that the discarding probability is greater than or equal to the preset cache occupancy threshold.

5. The method according to claim 1, further comprising: discarding the data packet in response to that the cache occupancy amount is greater than the third cache occupancy threshold.

6. A non-transitory computer readable storage medium, configured to store a computer readable instruction, wherein when the computer readable instruction is executed by one or more processors, the data processing method according to claim 1 is implemented.

7. A computing device, comprising: a memory, a processor, and a computer program stored in the memory and executable on the processor, wherein the processor is configured to execute the computer program to perform the following:
    determining whether a cache occupancy amount corresponding to a data packet is greater than a second cache occupancy threshold and less than a third cache occupancy threshold;
    determining a priority of the data packet based on a cache occupancy amount being greater than a second cache occupancy threshold and less than a third cache occupancy threshold, wherein the priority comprises a first priority, a second priority and a third priority, the third priority is higher than the second priority, and the second priority is higher than the first priority;
    discarding the data packet in response to a determination that the priority of the data packet is the first priority;
    storing the data packet in response to a determination that the priority of the data packet is the third priority;

calculating a discarding probability of the data packet based on a current occupancy amount of the cache, a size of the data packet, the second cache occupancy threshold, and the third cache occupancy threshold, in response to a determination that the priority of the data packet is the second priority, wherein the second cache occupancy threshold and the third cache occupancy threshold correspond to the second priority and the third priority respectively; and storing the data packet with the second priority into the cache in response to that the discarding probability is less than a preset cache occupancy threshold.

8. The computer device according to claim 7, wherein processor is further configured to execute the computer program to perform the following:

determining whether the cache occupancy amount is less than a first cache occupancy threshold; and storing the data packet into the cache in response to that the cache occupancy amount is less than a first cache occupancy threshold, wherein the first cache occupancy threshold corresponds to a first priority.

9. The computer device according to claim 7, wherein the first cache occupancy threshold is equal to a half of a size of the cache and occupies a first half of the cache size, and the second cache occupancy threshold and the third cache occupancy threshold distribute in a second half of the size of the cache.

10. The computer device according to claim 7, further comprising: discarding the data packet in response to that the discarding probability is greater than or equal to the preset cache occupancy threshold.

11. The computer device according to claim 7, further comprising: discarding the data packet in response to that the cache occupancy amount is greater than the third cache occupancy threshold.

\* \* \* \* \*